(12) United States Patent
Cavina et al.

(10) Patent No.: US 6,627,826 B2
(45) Date of Patent: Sep. 30, 2003

(54) UNIT FOR ADVANCING CONTAINERS ALONG A CONVEYING LINE AND FOR TRANSFERRING THE CONTAINERS FROM THE CONVEYING LINE TO A WEIGHING STATION AND VICE-VERSA

(75) Inventors: Luigi Cavina, Bologna (IT); Paolo Tacchini, Monte S. Pietro (IT); Gianfranco Salmi, Bologna (IT)

(73) Assignee: I.M.A. Industria Macchine Automatiche S.p.A., Bologna (IT)

( * ) Notice: Subject to any disclaimer, the term of this patent is extended or adjusted under 35 U.S.C. 154(b) by 149 days.

(21) Appl. No.: 09/979,474
(22) PCT Filed: May 16, 2001
(86) PCT No.: PCT/IB01/00399
§ 371 (c)(1), (2), (4) Date: Nov. 14, 2001
(87) PCT Pub. No.: WO01/68451
PCT Pub. Date: Sep. 20, 2001

(65) Prior Publication Data
US 2002/0157879 A1 Oct. 31, 2002

(30) Foreign Application Priority Data
Mar. 17, 2000 (IT) ..................................... BO2000A0147

(51) Int. Cl.[7] .............................................. G01G 19/00
(52) U.S. Cl. ........................ 177/145; 177/146; 141/83
(58) Field of Search ................... 177/145, 119, 177/120, 121, 146; 141/83

(56) References Cited

U.S. PATENT DOCUMENTS

| | | | | | |
|---|---|---|---|---|---|
| 4,238,027 A | * | 12/1980 | Oelte | ........................ | 177/145 |
| 4,403,680 A | * | 9/1983 | Hillesheimer | ............... | 177/146 |
| 4,605,047 A | | 8/1986 | Bausch et al. | ................ | 141/83 |
| 4,929,459 A | | 5/1990 | Silvestrini | ................... | 426/399 |
| 5,004,093 A | * | 4/1991 | Blezard | ....................... | 177/145 |
| 5,193,630 A | * | 3/1993 | Cane | .......................... | 177/145 |
| 5,256,835 A | * | 10/1993 | Rydzak | ....................... | 177/145 |
| 5,306,877 A | * | 4/1994 | Tas | .............................. | 177/145 |
| 5,504,278 A | * | 4/1996 | Deters et al. | ............... | 177/145 |
| 5,740,843 A | * | 4/1998 | Burkart | ........................ | 141/83 |
| 5,877,457 A | * | 3/1999 | Corniani et al. | ............ | 177/120 |
| 5,929,387 A | * | 7/1999 | Inglin | .......................... | 177/145 |
| 6,073,667 A | * | 6/2000 | Graffin | ........................ | 141/83 |
| 6,084,184 A | * | 7/2000 | Troisi | .......................... | 177/145 |

* cited by examiner

Primary Examiner—Randy Gibson
(74) Attorney, Agent, or Firm—William J. Sapone; Coleman Sudol Sapone, P.C.

(57) ABSTRACT

An operative unit (1) advances containers (2) along a conveying line (3) and transfers the containers from the conveying line to one weighing station (4) and vice-versa. An endless conveyor (6) of the operative unit passes through the weighing station (4) and a sliding track (S), on which the containers (2) move, is disposed parallel to the conveyor (6). Moving modules (70) are removably fastened to the conveyor and move the containers (2) on the sliding track (S) A platform (8) forms a portion of the sliding track (S) and is situated in correspondence to the weighing station (4). The containers (2) supported by the platform (8) are temporarily disengaged from the moving means (70) and placed in the weighing station (4).

9 Claims, 4 Drawing Sheets

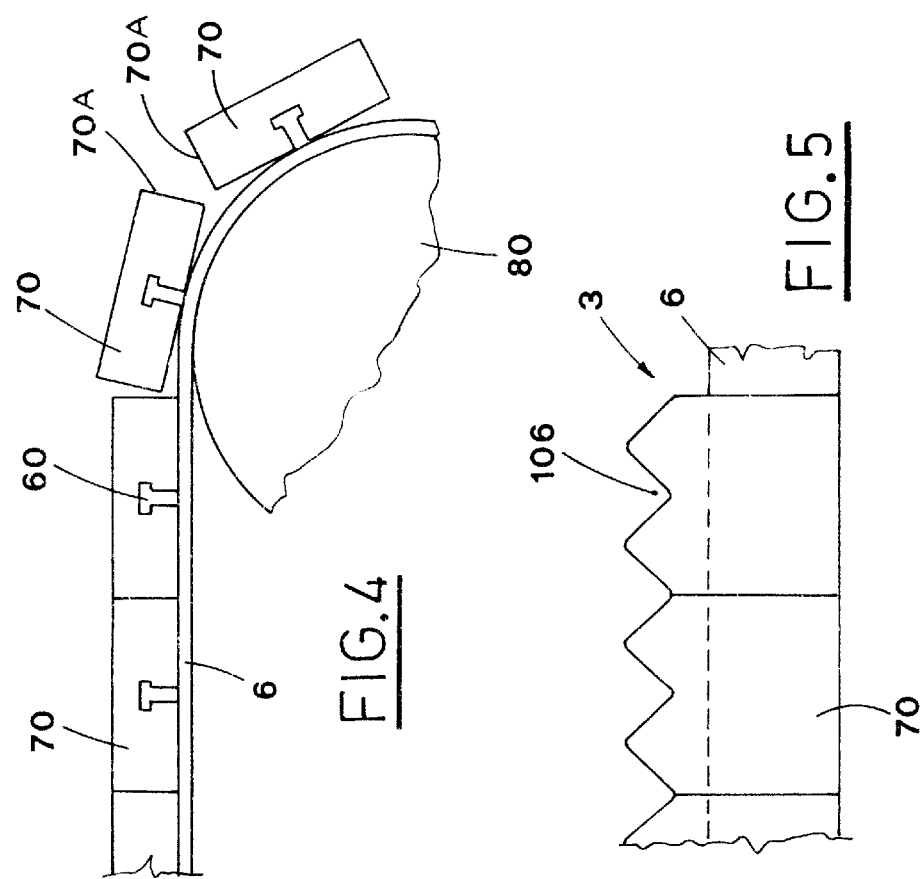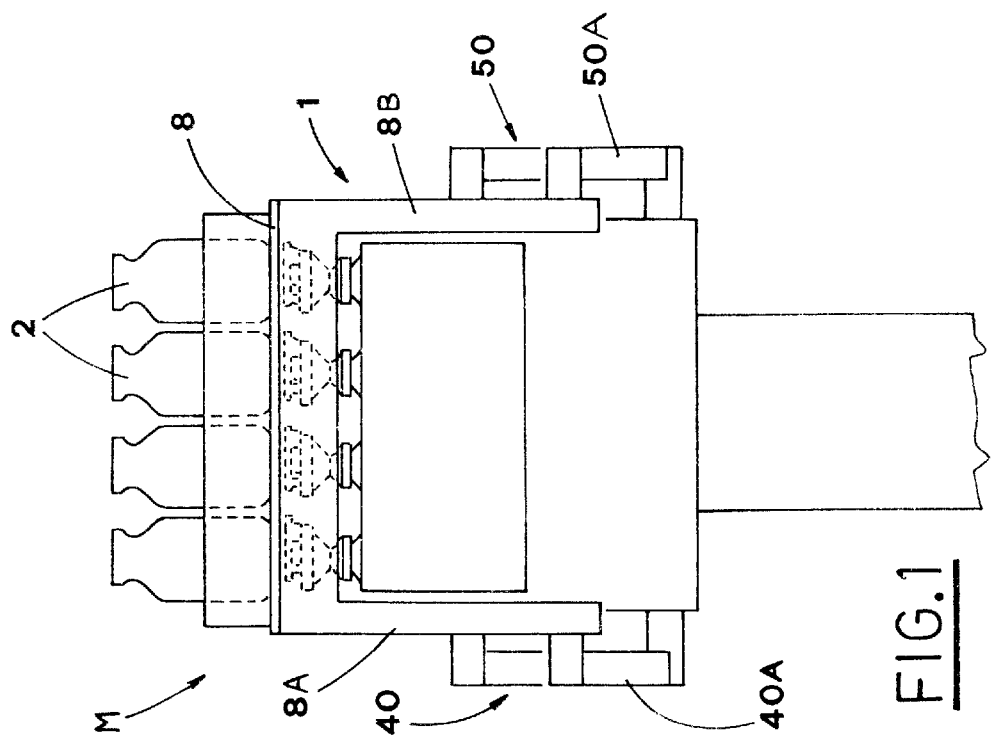

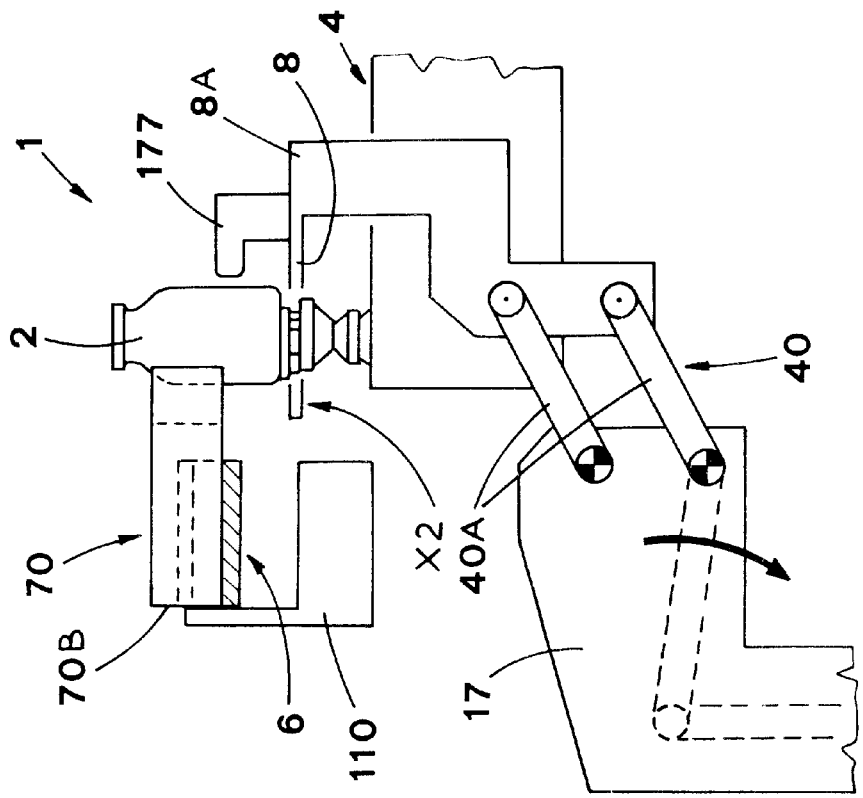
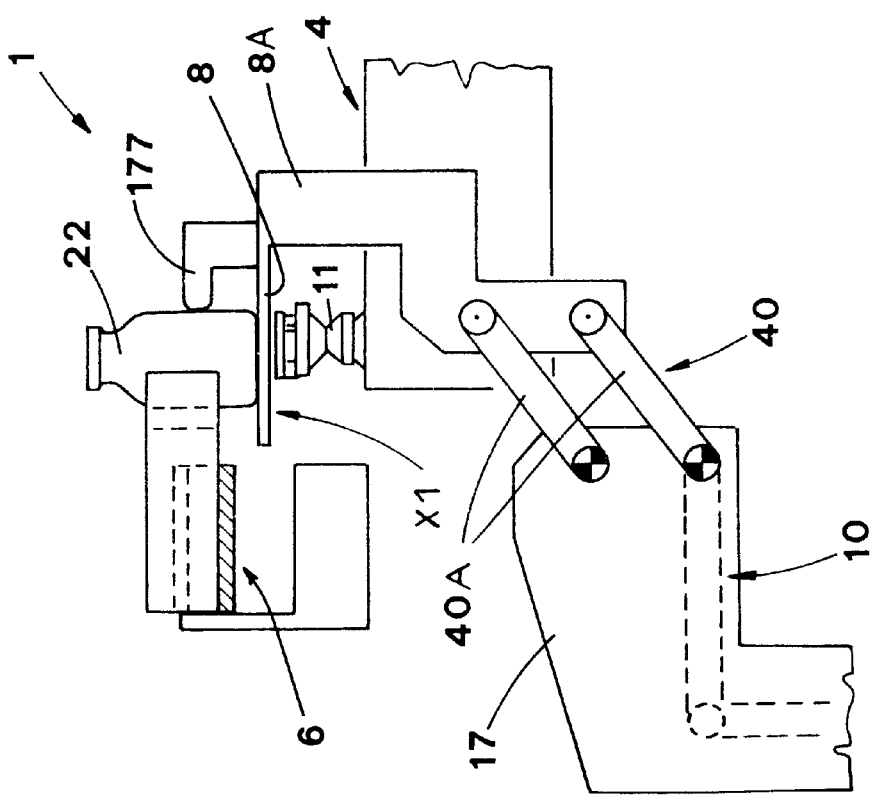

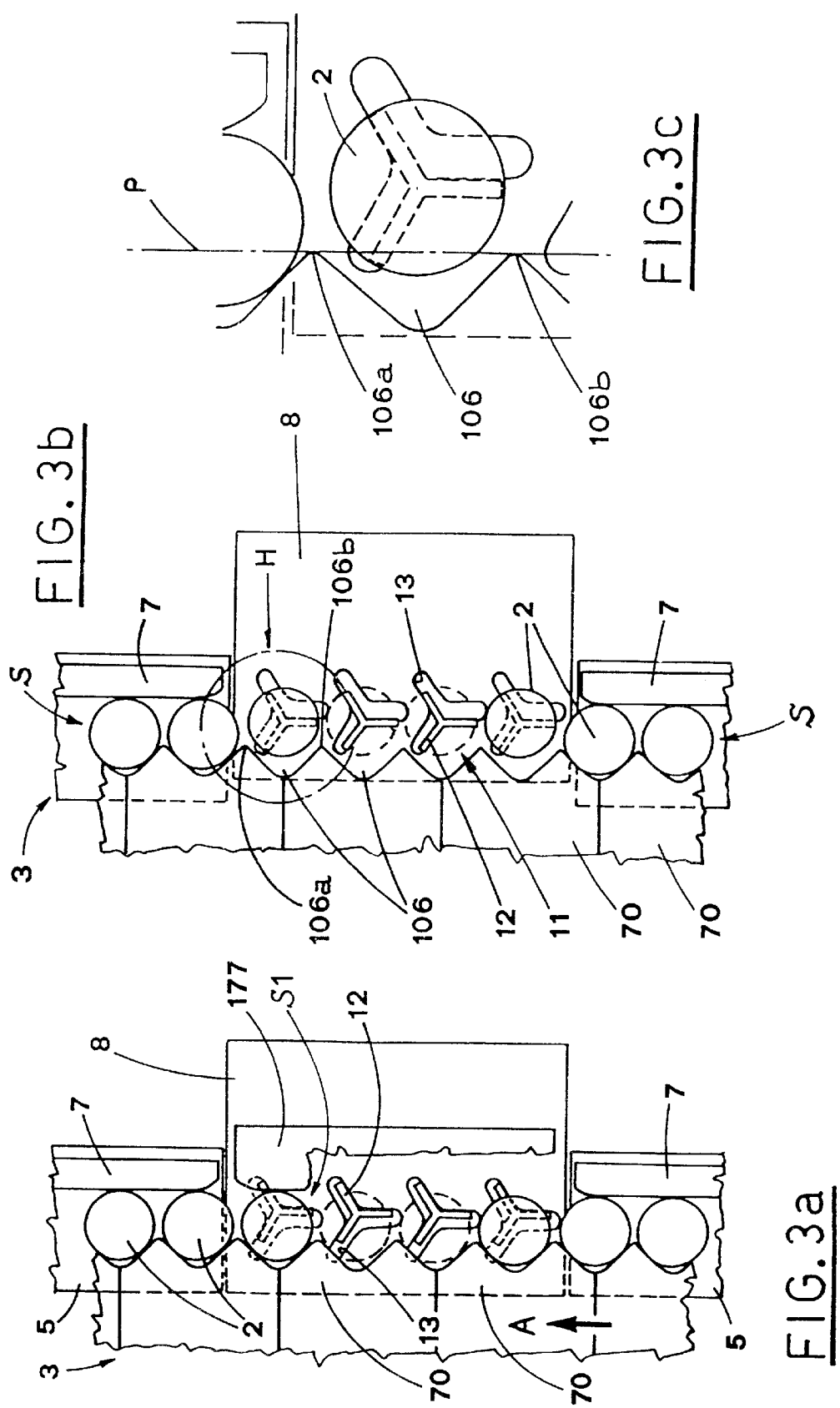

UNIT FOR ADVANCING CONTAINERS ALONG A CONVEYING LINE AND FOR TRANSFERRING THE CONTAINERS FROM THE CONVEYING LINE TO A WEIGHING STATION AND VICE-VERSA

BACKGROUND OF THE INVENTION

The present invention relates to packaging products into containers. In particular, the invention relates to an operative unit for advancing containers along a conveying line and for transferring the containers from the conveying line to a weighing station and vice-versa.

The proposed invention concerns also packaging of pharmaceutical products, in particular within a sterile environment, so that the articles introduced into containers are not contaminated

DESCRIPTION OF THE PRIOR ART

Generally, considering sterile working environments, problems have been encountered in avoiding, as much as possible, the presence of sources of pollution.

In particular, it is required that machines working in sterile environments, during normal operation, have no elements which move along prismatic coupling. For this purpose, the power means are generally contained in a hermetic structure, called "gray area", separated from the sterile environment.

In specific case of machines for packaging liquid or powder pharmaceuticals into containers, such as bottles and the like, transferring the containers from and to a weighing station is a particularly critical operation.

Actually the transfer operation of the containers to be weighed to the weighing means, which requires moving elements, must not constitute a source of electrostatic pollution, so that the precision of the measurements performed by the weighing means is not compromised.

SUMMARY OF THE INVENTION

Therefore, the object of the present invention is to propose a operative unit, in particular for stepwise working machines for packaging products into containers, which allows to feed containers along a conveying line and to transfer the containers from the conveying line to a weighing station, situated therealong, and vice-versa, so that the weighing is in no way affected by possible electrostatic loads generated by the elements of the unit which move the containers.

Another object of the present invention is to propose a operative unit which operates effectively no matter of the containers size.

A further object of the present invention is to propose a operative unit which does not constitute a source of pollution for the surrounding environment.

Still another object of the present invention is to propose a operative unit, which, beside the previous objects, maintains unchanged the orientation of the containers and moves them in a constant way.

Yet another object of the present invention is to propose a operative unit which achieves the above objects and allows to transfer the containers to a weighing station, so as to allow weighing of all the containers, as well as a statistic weighing.

The above mentioned objects are obtained in accordance with the content of the claims, by means of an operative unit for advancing containers along a conveying line and for transferring the containers from the conveying line to at least one weighing station and vice-versa, the operative unit including:

an endless conveyor passing through the weighing station;

a sliding track on which said containers move, said sliding track being parallel to said conveyor;

said unit being characterized in that it further includes:
moving means for moving said containers on said sliding track, said moving means being removably fastened to said conveyor;

a platform forming a portion of said sliding track situated in the region of said weighing station driving means connected to said platform for temporarily disengaging said containers supported by the platform from said moving means and for placing said containers in engagement with weighing means of said weighing station.

BRIEF DESCRIPTION OF THE DRAWINGS

The characteristic features of the present invention will be pointed out in the following description of a preferred, but not only embodiment, with reference to the enclosed drawings, in which:

FIG. 1 is a lateral view of the proposed operative unit during the containers transport;

FIGS. 2a and 2b are two lateral section views of the same operative unit, as seen crosswise to the containers conveying line, during a transport step and weighing step, respectively;

FIGS. 3a, 3b are corresponding top view of the operative unit shown in FIGS. 2a, 2b;

FIG. 3c is an enlarged view of a particular of the unit of FIG. 3b;

FIG. 4 is a schematic lateral view of a part of the conveying line;

FIG. 5 is a top fragmentary view of the upper run of the conveying line of FIG. 4; and FIG. 6 is the same view as FIG. 2a, with the conveying line, which is shaped in such a way as to receive a container, whose size is different from the one of FIG. 2a.

BEST MODES OF CARRYING OUT THE INVENTION

Figure 6:
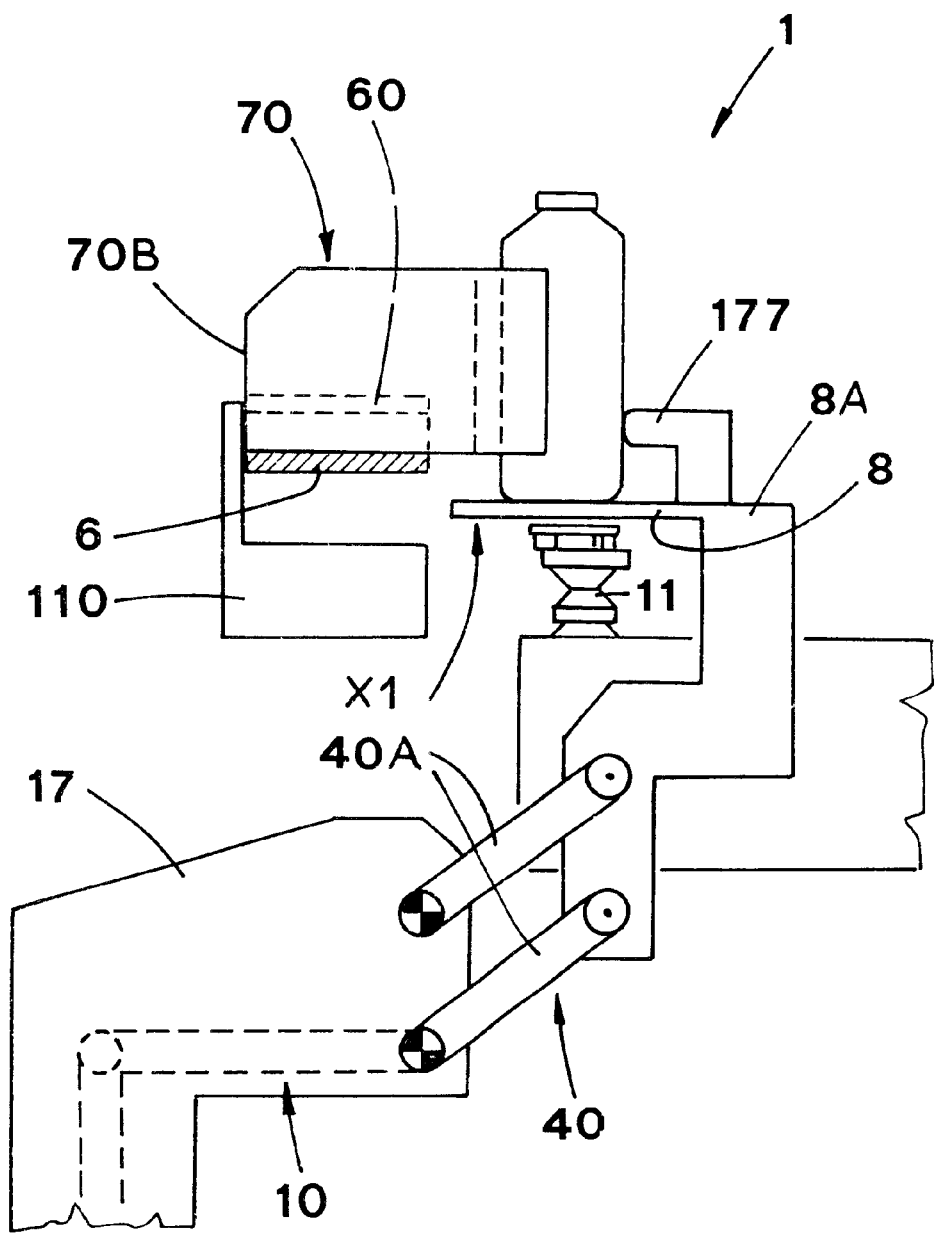

With reference to the above figures, reference numeral 1 indicates an operative unit, proposed by the present invention, which feeds containers 2, e.g. bottles 2, along a conveying line 3 and transfers the bottles 2 from the conveying line 3 to a station 4, where the bottles 2 are weighed (FIGS. 2a, 2b).

The unit 1 is a part of a machine M for packaging products, in particular pharmaceutical liquid or powder products, into containers, especially in a sterile environment.

The conveying line 3 is operated stepwise, the width of the step is such as to include a predetermined number of bottles 2: In the not limitative example shown in FIG. 1, the step width includes four bottles 2.

According to FIG. 4, the conveying line 3 includes a conveying belt 6, with gripping elements 60 fastened thereto. The gripping elements are turned outward of the belt 6 and set equidistant one from another, arranged vertical and crosswise to the belt 6. As seen in the example shown in FIG. 4, the gripping elements have a "T"-like section with respect to the longitudinal plane.

Each one of the gripping elements 60 is fitted, in a known way, into a complementary seat made in a module 70 or in a removable moving member shaped as shown in the Figures. The modules 70 are made from an antistatic material.

The longitudinal dimension of the modules 70 allows best contact of the relative transversal heads 70A of the adjacent modules 70 in correspondence to the upper and lower runs of the belt 6 (FIGS. 3a, 3b, 4, 5). Obviously, in the regions of end pulleys 80, (one of which is shown in FIG. 4), onto which the belt 6 is mounted, the heads 70A of the two subsequent modules 70 move away from one each other.

As shown in FIG. 5, the shape of the inner longitudinal heads of the modules 70 defines, in the region of the upper run of the belt 6, a series of holding seats 106, equidistant and substantially V-like, aimed at receiving corresponding bottles 2.

The belt 6—modules 70 assembly defines the above mentioned conveying line 3.

The conveying line 3 moves the bottles 2, supported on a running surface 5, in the direction indicated with the arrow A in FIG. 3a.

A sliding side bar 7, whose position is adjustable, cooperates with the conveying line 3.

The running surface 5, together with the sliding side bar 7, form a stationary sliding track S for the bottles 2.

A longitudinal motionless striker 110, made of conducting material and suitably connected to ground according to known techniques, is joined to the conveying line 3, at least in the region of the relative upper run of the belt 6.

The outer longitudinal surface 70B of the modules 70, i.e. the surface without the receptacles 106, rubs against the striker 110 (See FIG. 6).

As shown in the enclosed figures, a platform 8 is set in the conveying line 3, so as to extend in the running surface 5 of the bottles 2 in the region of the weighing station 4.

Actually, the platform 8 is set into a space made in the running surface 5, so as to maintain its continuity.

In its upper part, the platform 8 carries a lateral guide 177 (FIGS. 2a, 2b and 6), whose position is adjustable. Thus, a sliding track S1 (seen in FIG. 3a) is defined by the platform 8 and the guide 177.

According to FIGS. 1 and 6, the platform 8 is carried by two vertical lateral struts 8A, 8B, extending downwards in FIG. 1. The ends of the bars 40A, 50A of a first and a second four-bar linkages 40, 50, are hinged to the struts 8A and 8B while the other ends of the bars are hinged to a stationary structure 17.

The four-bar linkages 40, 50 are moved synchronously by a driving member 10, which acts e.g. on one bar 40A of the first four-bar linkage 40.

More precisely, the driving member 10 moves the platform 8, maintaining its horizontal position, in the region of the weighing station 4, between a raised transport position X1 (FIGS. 2a and 3a), which is situated at the level of the running surface 5 and in which the sliding side bar 7 and the guide 177 are aligned, and a lowered weighing position X2, in which the bottles 2 to be weighed are supported by relative weighing means 11 (FIGS. 2b and 3b).

In their upper part, the weighing means 11 are equipped with supporting means 12, which protrudes out of corresponding apertures 13 made in the platform 8, in the lowered weighing position X2.

The supports 12 are arranged with a radial pattern, in particular a tricuspid pattern, and pass through apertures 13, whose shape is correspondingly tricuspid-like. This pattern does not obstacle the running of the bottles 2 on the platform 8.

Operation of the device will be described in the following, beginning from a stage, in which the bottles 2 move stepwise along the conveying line 3.

When the bottles are being moved along the conveying line, the platform 8 is in the raised position X1 and is coplanar with the running surface 5 (FIGS. 2a and 3a). In this condition the sliding track S1 of the platform 8 is aligned with the stationary sliding track S.

The weighing operation is performed while the moving modules 70 are stopped. It is to be pointed out that the length of the platform 8 allows to receive firmly the bottle 2, or bottles 2 included in a one-step motion.

In order to weigh the bottles 2, the platform 8 is moved to the lowered position X2, in which it is temporarily removed from the conveying line 3 (FIGS. 2b and 3b). In this way, the bottles 2 are temporarily disengaged from the moving modules 70 and placed onto the weighing means.

In further detail, the movement of the platform 8 to the lowered position is controlled by the driving member 10, which operates synchronously the four-bar linkages 40, 50.

Consequently, the platform 8 moves, maintaining its horizontal position, from the raised transport position X1 to the lowered weighing position X2, in which the supports 12 of the weighing means 11 protrudes from the corresponding apertures 13 of the platform 8.

Thus, the bottles 2 rest on the weighing means 11 by means of the supports 12. The weighing means 11 measure the weight of the bottles 2.

In this situation, the sliding track S1 of the platform is moved away from the stationary sliding track S.

It is to be pointed out that each bottle 2 remains, although partially, inside the relative seat 106, as can be seen in FIGS. 2b and 3b and in the enlarged particular H (FIG. 3c).

It appears evident that the mixed-broken line, indicated with P in FIG. 3c, which perfectly aligns respective outer positions 106a, 160b delimiting a seat 106, intersects the corresponding container 2.

Obviously, at the end of the weighing step, the opposite movement of the platform 8 lifts the bottles 2 from the weighing means 11 and places them again on the conveying line 3.

When the size of the bottles 2 is to be changed, the removable modules 70 are substituted with other modules of suitable size, so that the modules match the bottles 2 in the centermost position, as seen in FIG. 6.

The proposed unit 1 optimizes and stabilizes the weighing of bottles 2, as the oscillation of the bottles 2 during the weighing operation is reduced to negligible values.

This is obtained substantially by two technical-functional aspects.

First, the bottles 2 are positioned on the platform 8 by the movement of the modules 70, whose dimension is related to the size of the bottles 2: this allows to hold the bottles centrally, which is extremely positive, as when the belt 6 is stopped, no undesirable oscillations of the bottles resting on the platform 8 are generated.

Then, the platform 8 is moved from the raised position X1 to the lowered position X2 (in which the bottles 2 are weighed) by, as has been already pointed out, by a pair of four-bar linkages 40, 50, which are situated symmetrical to a plane transversal to the conveying line 3; this characteristic feature allows to reduce, practically to eliminate, the oscillations of the bottles 2, when the support thereof is temporarily changed: actually, the passage occurs from the platform 8 directly to the weighing means 11.

This is extremely important as it allows to optimize the weighing, without prolonging the stop of the bottles 2 on the weighing means 11.

All what above, positively influences the productivity of the machine M, and the proposed unit 1 is an integral part of the machine.

It is also to be pointed out that the weighing operation is not influenced by electrostatic induced charges; actually, the modules 70 are made of antistatic material and possible electrostatic charges are ground-discharged by the striker 110.

The members moving the bottles 2, i.e. the modules 70, move away from one another in correspondence to the pulleys 80, on which the belt 6 winds: this fact facilitates the cleaning operations.

Another advantage of the proposed unit derives from the fact that the transport of the bottles 2 to the weighing station 4 does not create pollution for the sterile environment, as the emission of impurities caused by the prismatic or similar couplings is avoided.

The above mentioned result, i.e. the absence of pollution of the sterile environment, is obtained without influencing the weighing, so as to obtain reliable results of this operation.

In fact, the bottles 2 are moved, as it has already been said, only by the movement of the four-bar linkages 40, 50, which support the platform 8, driving the latter to perform a short and rapid stroke.

Therefore, no vortexes or other perturbations are created, which could affect the measuring. Consequently, the unidirectional flow of air, directed downwards in known way, created inside the machine M equipped with the operative unit 1, is not disturbed.

The shape of the proposed unit 1 is such as not to cause oscillations of the bottles 2 with respect to their vertical axis, which positively acts on the measurement precision and rapidity.

As specified, the driving member 10 acts on the four-bar linkages 40, 50, so as to temporarily disengage the platform 8 from the conveying line, in order to carry the bottles 2 to be weighed.

This configuration ensures that when the bottles 2 are brought in engagement with the weighing means 11, they remain, in any position, between the walls of the relative seat 106 (as pointed out in FIG. 3c). This allows to keep each bottle 2 in registry with one seat 106.

The above described aspect is known to those skilled in the field, as "bottles positive transport".

It is to be noted that the operative unit 1 is preferred and used for feeding along the line 3 and transporting the bottles 2 to the weighing station 4, so as to weigh all the bottles 2.

However, it is possible, if required, to perform a statistical or sample weighing of the bottles 2.

In this case, the driving member 10 of the platform 8 is locked in determined moments, so as to define the raised transport position X1.

In this position, the platform 8 cannot move to the lowered weighing position X2.

Finally, it is to be noted that present machines for packaging products into bottles are usually equipped with two bottles weighing stations, situated one upstream the other, and with a station for filling the bottles with products, situated between the two weighing stations.

One of the two weighing stations is used for measuring the bottles tare, and the other for measuring the bottles gross weight.

What is claimed is:

1. An operative unit (1) for advancing containers (2) along a conveying line (3) and for transferring the containers from the conveying line to at least one weighing station (4) and vice-versa, the operative unit including:

an endless conveyor (6) passing through the weighing station (4);

a sliding track (S) on which said containers (2) move, said sliding track being parallel to said conveyor (6);

said unit being characterized in that it further includes:

moving means (70) for moving said containers (2) on said sliding track (S), said moving means being removably fastened to said conveyor (6);

a platform (8) forming a portion of said sliding track (S) situated in the region of said weighing station (4);

driving means (40,50,10) connected to said platform for temporarily disengaging said containers (2) supported by the platform (8) from said moving means (70) and for placing said containers (2) in engagement with weighing means (11) of said weighing station (4).

2. An operative unit, according to claim 1, wherein said driving means (40,50,10) move said platform (8), maintaining its horizontal position, between a transport position (X1), in which said containers (2) to be weighed are being moved, and a weighing position (X2), in which said containers (2) are disengaged from said conveying line (3) and placed on said weighing means (11).

3. An operative unit, according to claim 2, wherein said platform (8) has apertures (13) and said weighing means (11) include supporting means (12) for supporting the containers (2) with arrangement matching said apertures, said weighing means (11) protruding from said apertures (13) of said platform (8) when said platform is in said weighing position (X1).

4. An operative unit, according to claim 1, wherein said platform (8) is carried by two vertical lateral struts (8A,8B), and said driving means (40,50,10) of the platform (8) include:

two four-bar linkages (40,50), with each four-bar linkage hinged, at one side to a corresponding strut of said lateral struts (8A,8B), and at another side to a stationary structure (17); and a driving member (10) for driving said four-bar linkages (40,50), said driving member (10) acting on at least one bar (40a,50a) of said four-bar linkages (40,50).

5. Unit, according to claim 1, wherein said moving means (70) feature holding seats (106) for receiving corresponding containers (2) during advancement.

6. An operative unit, according to claims 2, wherein said moving means (70) feature holding seats (106) for receiving corresponding containers (2) during advancement, and said platform (8) is moved from the transport position (X1) to the weighing position (X2) while keeping each container (2) matching a corresponding holding seat (106).

7. An operative unit, according to claim 1, characterized in that said moving means (70) are made of antistatic material.

8. An operative unit, according to claim 1, wherein said conveying line (3) includes a striker (110), made of conducting material and connected to ground, with moving means (70) rubbing against said striker (110) at least in the region of said weighing station (4).

9. An operative unit, according to claim 1, wherein said sliding track (S) includes:

a first stationary part (S), defined by a running surface (5) and by a lateral sliding side bar (7), said lateral sliding side bar (7) having adjustable position and being situated in front of said moving means (70); and a second part (S1), defined by said platform (8) and a lateral guide (177), situated on said platform (8) in adjustable position and in front of said moving means (70).

* * * * *